May 22, 1962 J. L. DESVIGNES ET AL 3,035,664
DISC BRAKE
Filed Aug. 28, 1957 2 Sheets-Sheet 1
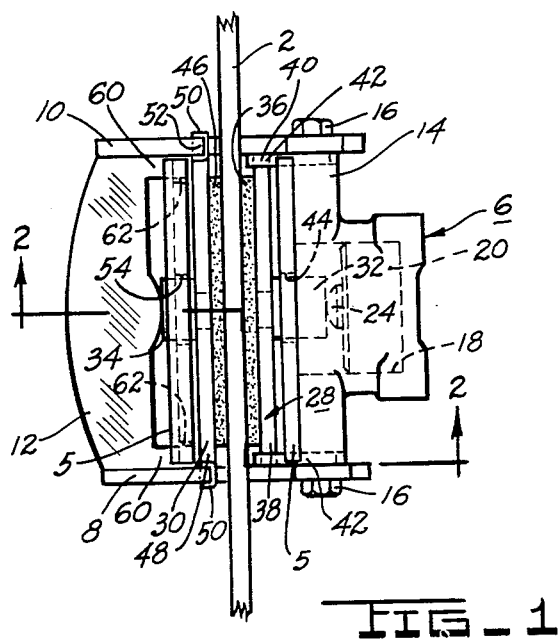
FIG_1
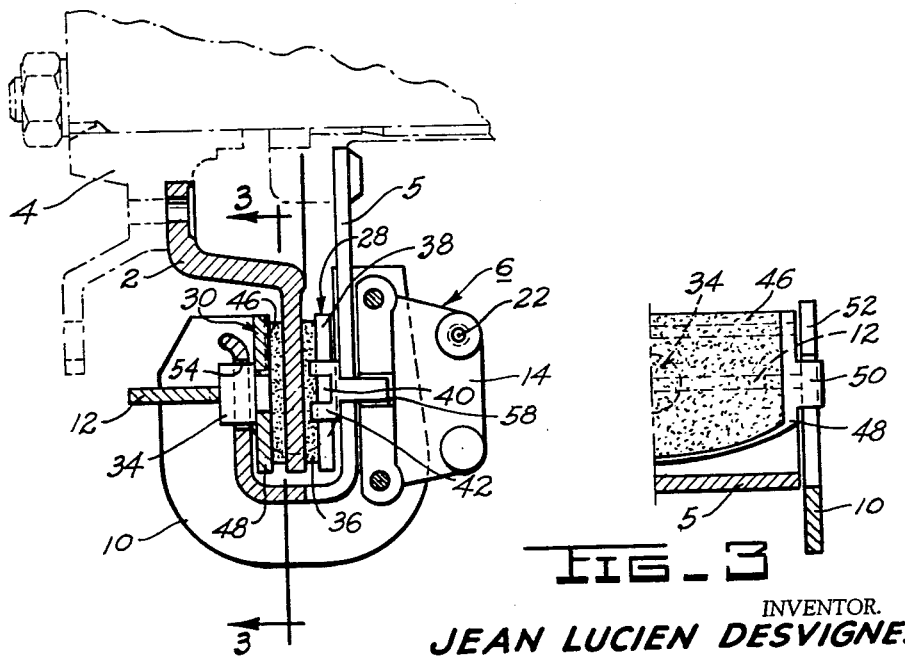
FIG_2 FIG_3
INVENTOR.
JEAN LUCIEN DESVIGNES
PIERRE GANCEL.
BY Cecil F Arens
ATTORNEY

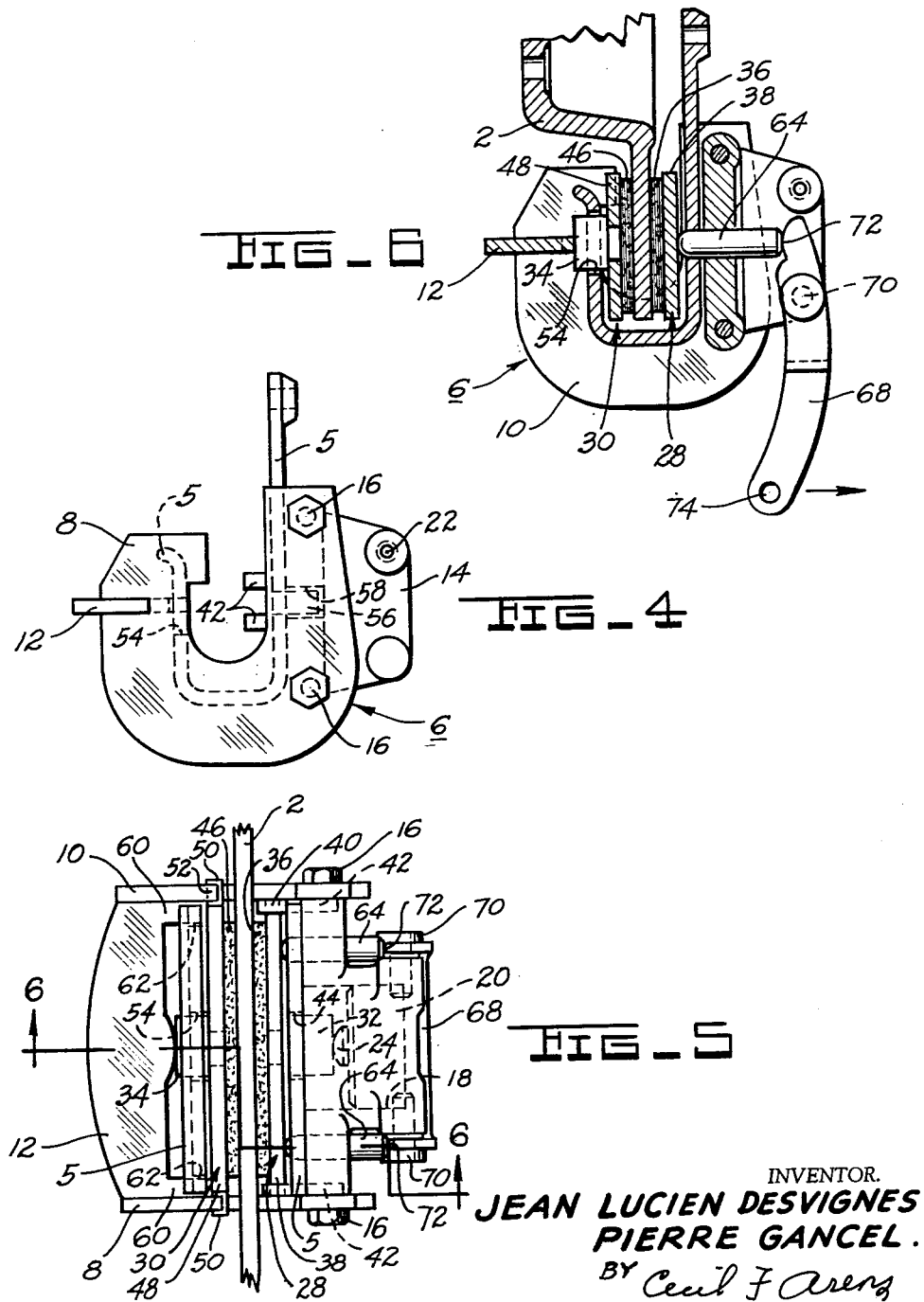

United States Patent Office 3,035,664
Patented May 22, 1962

3,035,664
DISC BRAKE
Jean Lucien Desvinges, Viroflay, and Pierre Gancel, Levallois, France, assignors to The Bendix Corporation, a corporation of Delaware
Filed Aug. 28, 1957, Ser. No. 680,782
8 Claims. (Cl. 188—73)

This invention relates to a disc brake, and more particularly a brake of the type comprising a rotatable disc adapted to be pressed between two wear pads, one of which is carried by an axially slidable housing and the other of which is axially movable with respect to said housing. In a preferred embodiment of the invention, which will be described hereinafter, the two wear pads extend only over a small angular portion of the disc to provide for more efficient cooling of the brake by convection and radiation.

An important object of the invention is to design a new and improved brake of the above type, which is of a simplified construction and which has a novel arrangement of the parts thereof, resulting in a reduction of the size and weight of the brake without decreasing the rigidity of the latter.

Another object of the invention is to provide a brake in which the circumferential anchoring force of the wear pads is transmitted directly to the support member instead of being transmitted through the housing, which therefore does not need to be constructed as rigid as it would otherwise. However, the axial stresses are taken by the housing, which is designed to adequately withstand them. The housing does not retransmit these axial stresses to the support member, and, therefore, the support member can be constructed with less axial rigidity.

It is another object of this invention to provide a housing of simple design the major components of which are mostly formed by stampings. The housing comprises two yoke members, which ensure its axial rigidity and which are interconnected at one side of the disc by a transversal brace member and at the other side of said disc by a cylinder casting, the said last two members being arranged to transmit the axial stresses to the yoke members.

Another object of the invention is to guide the housing on the support member by a sliding connection therebetween. This connection comprises two guide members provided on the support member on which the cylinder casting is adapted to slide and two axial projections at the respective ends of the brace member adapted to slide in two notches provided in the support member.

Still another object of the invention is to form the wear pads as members adapted to yield slightly under the action of the applying force, so that only the outside edges of the linings remain in contact with the disc when the applying effort is released. To this effect, the applying thrust is exerted substantially at the center of the wear pads to generate on the center a slightly higher pressure and cause more rapid lining wear, and consequently a larger axial deflection of the wear pads at their centers. When the brake is released this deflection ceases and the linings take such a concave shape that only their outside edges remain in contact with the disc. This feature is not only applicable to disc brakes embodying the invention but to brake systems of any kind.

The above and other features of the invention will appear more fully hereinafter from a consideration of the following description taken in connection with the enclosed drawings, given only by way of example and in which:

FIGURE 1 is a top view of an inside disc brake embodying the invention, the disc being only partly shown;

FIGURE 2 is a section taken on the line 2—2 of FIGURE 1;

FIGURE 3 is a sectional view taken on the line 3—3 of FIGURE 2, showing the arrangement of the wear pad associated with the housing;

FIGURE 4 is a side elevation of the housing and of the fixed support member;

FIGURE 5 is a view similar to FIGURE 1 but illustrating another embodiment of the invention including a mechanical applying means (parking brake); and FIGURE 6 is a sectional view taken on the line 6—6 of FIGURE 5.

In the embodiment shown in FIGURES 1, 2, 3 and 4, the brake comprises a rotating disc 2 fixed to the hub 4 of the wheel, a fixed support member 5 (which can be manufactured by stamping) fixed to the steering knuckle or to the axle casing, and a housing indicated generally by 6 and adapted to slide on the fixed support member 5. The support member has a U-shaped cross section and comprises two legs, each of which is adjacent to one face of the disc. The opening of the U can be directed either towards the center of the brake, as shown on the drawings, or towards the periphery of the brake. The housing 6 comprises two C-shaped yoke members 8 and 10 (FIGURE 1) formed as stampings connected by a brace member 12 on one side of the disc, and by a cylinder casting 14 fixed by screws 16 on the other side of the disc.

In the cylinder casting 14 there is provided a cylinder bore 18 in which reciprocates a piston 20 actuated by pressure fluid admitted through an inlet port 22 provided at the bottom of the cylinder. The cylinder is also provided with a bleeding port (not shown). The piston 20 is formed with a spherical projection 24 which takes support on the movable wear pad 28 through the intermediary of a cylindrical abutment stud 32 rigidly connected to said pad. In the same manner, the wear pad 30 which is connected to the housing 6 takes support on the brace member 12 through the intermediary of a cylindrical abutment stud 34 rigidly connected to said pad.

Due to the axial connection provided by the abutment studs 32 and 34 between the housing and the respective wear pads 28 and 30 the said pads are precluded from transmitting to the housing the reaction exerted by the rotatable disc on these pads. An additional device is provided to insure the transmission of this reaction to the fixed support member. In the preferred embodiment shown on FIGURES 1 to 4 this reaction is transmitted by the abutment studs 32 and 34.

The movable wear pad 28 is formed by a steel sheet plate 38 sufficiently thin to be flexible, on which is fixed the abutment stud 32. The face of the plate adjacent the disc 2 is lined with a friction lining 36. This plate has two lateral projections 40 adapted to slide in fork members 42 connected to the fixed support member 5, so that the torque reaction which tends to rotate the pad about the abutment stud 32 is absorbed by the fulcrum the lateral projections 40 take on the fork members 42. The abutment stud 32 which is in engagement with the projection 24 is slidably guided in an opening 44 formed in one leg of the support member 5 (an anti-friction sleeve, for instance in bronze, is preferably interposed between said stud and the support member to stabilize the friction). The reaction exerted by the wear pad is thus directly transmitted to the support member 5.

The fixed wear pad 30 is also formed by a lining 46 bonded to a steel sheet plate 48, in which is engaged the abutment stud 34. The plate 48 is provided with two lateral projections 50 the edges of which slidably engage shoulders 52 of the yoke members (see FIGURE 3). The abutment stud 34 before coming into engagement with the brace member 12, is reciprocably guided with or without the interposition of an anti-friction sleeve in an opening 54 formed in the support member 5. The reaction of the wear pad 30, which is fixed with respect to the housing, is thus transmitted directly to the fixed support member 5, the remaining torque reaction being absorbed by the fulcrum of one of the projections 50 on the corresponding shoulder 52.

In a slightly different embodiment, the guiding opening 54 may be replaced, for the sake of easier removal of the wear pad, by an open slot, and the abutment stud 34 is formed with two vertical flat faces in smooth contact with the parallel edges of said slot. In this case the torque reaction can be absorbed either by the two flat faces, or by fulcrum of the lateral projections 50 on the shoulders 52.

On application of the brake, the piston 20 applies the movable wear pad 28 through the intermediary of the abutment stud 32 which exerts an effort substantially at the center of the lining. The resulting resilient deflection of the steel plate 38 under the action of this localized effort causes the lining 36 to wear to a slightly hollow shape at the center, so that when the applying effort is released, the resiliency of the pad is sufficient to push back the piston until the lining 36 bears only by its edge on the disc 2. The resilient force exerted by the wear pad is sufficient to overcome the friction of the stud 32 on the inner surface of the guiding opening 44 but this friction maintains the edge of the lining in contact with the disc once the pad has regained its original shape.

The applying effort of the fixed wear pad 30 is also exerted near the center of the lining through the intermediary of the abutment stud 34 and, similarly to wear pad 28, the resilient deflection of the steel plate 48 results in a hollow shape of the lining. When the brake is released, the wear pad 30 exerts on the brace member 12 an effort larger than the friction of the stud 34, thus pushing back the housing until the lining 46 only bears by its edge on the disc 2. Once the pad has regained its original shape, the friction force exerted by the guiding opening 54 on the stud 34 keeps the edge of the wear pad in contact with the disc.

The application point of the axial effort of the wear pads, that is to say the position of the abutment studs, should be such that under the action of wear the lining will acquire a hollow shape. For this purpose, there should be taken into account the differences in linear velocity on the disc surface and the moment of the circumferential braking effort with respect to the application point of the axial effort, as already shown and claimed in copending application Serial No. 609,222, now Patent No. 2,937,722, issued May 24, 1960.

The axial guiding of the housing 6 with respect to the fixed support member 5 is realized by two sets of guiding members. On one side of the disc two guide members 56 (FIGURE 4) connected to the fixed support member 5 (and which can be integrally made with the fork members 42 or independently secured to the support member) are received into recesses formed by complementary faces of axial slots 58 in the cylinder casting and in the yoke members. On the opposite side of the disc, the brace member 12 is provided, along the yoke members, with two axial extensions 60 which are slidably received in notches 62 formed in the adjacent leg of the support member. The length of the guide members 56 and of the brace member extensions 60 is such that the housing can move by a distance corresponding to the original thickness of the lining of the fixed wear pad.

Another embodiment of the invention, shown in FIGURES 5 and 6, comprises a certain number of modifications intended to adapt to the above type of brake a mechanical applying means (designated as parking brake) in supplement to the hydraulic actuation which is the usual method of application of the brake.

Two push pins 64 are operated by a lever 68 formed by two symmetrical curved plates welded together so that the unit has the shape of a fork; this lever 68 pivots about two coaxial pins 70, perpendicular to the symmetry plane of the brake, and secured to the cylinder casting. The two ends 72 of the fork come into abutment either with the end of the push pins 64, or with the bottom of notches formed in said push pins. The other end of the lever 68 is formed with an eye 74 for connection to the parking brake actuating linkage. A pull on the actuating linkage in the direction of the arrow tends to turn the lever 68 and causes the application of the wear pads.

In the embodiment shown on FIGURE 5, the push pins 64 only have an abutting connection with the movable wear pad. However it is to be noted that it is possible to use pins secured to said wear pad, so that the pins are used simultaneously for the application of the movable pad and for the guiding of the housing with respect to the support member. In this csae, the guide members 56 could be omitted.

The operation of the brake is as follows: In their normal position, the linings of wear pads 28 and 30 are in contact with the disc by their outer edge. Of course when the linings are new, the entire surface of each lining is in contact with the disc, but the lining acquires a hollow shape after a few applications of the brake. It is also possible to manufacture linings having a slightly hollow shape. When the driver, upon depression of the brake pedal, develops a pressure in the master cylinder connected to the cylinder bore 18, two equal and opposed forces act on the rear part of the piston 20 and on the bottom of the cylinder bore 18.

The force exerted on the piston 20 is transmitted by the spherical projection 24 and the abutment stud 32 to the wear pad 28 and applies it against the rotating disc. The force exerted on the bottom of the cylinder bore is transmitted by the yoke members to the brace member 12 and to the abutment stud 34 which applies the wear pad 30 against the disc with a force equal to the preceding one, so that no axial effort is exerted on the disc. Although the applying effort of the pads is localized, it is distributed over the whole surface of the linings, with however a greater intensity near the center which results in the hollow wear described above.

As the lining wears, the wear pad 28 moves axially with respect to the support member, the friction between the abutment stud 32 and the guiding opening 44 being overcome by the applying effort. At the same time, the lateral projections 40, which are in engagement with the bottom of the fork members 42 when the lining is new, move closer to the disc. The fork members are of course deep enough to avoid the pad disengaging therefrom after a certain amount of wear of the lining.

The wear of the lining of the fixed wear pad is compensated by a movement of the housing under the pressure exerted on the bottom of the cylinder bore 18. This pressure causes an advance of the abutment stud 34 in its guiding opening in spite of the friction, the lateral projections 50 of the pad remaining in the same position with respect to the shoulders 52 of the yoke members.

During this displacement of the housing, the axial extensions 60 of the brace member and the slots 58 of the cylinder casting respectively slide with respect to the notches 62 and to the guide members 56 of the support member 5.

When the driver releases the brake pedal, the steel sheet plates 38, 48 tend to resume their original shape by taking support on the disc through the intermediary of the lining edges, and resiliently push back the corresponding abutment stud which overcomes the friction force exerted on the latter by the guiding opening. The edge of the lining remains then permanently applied on the disc with a pressure corresponding to the friction force exerted on the abutment stud. Owing to the small surface in permanent contact with the disc, no heating of the latter occurs. The permanent contact of the edges offers on the other hand the great advantage of cleaning the surface of the disc. The action of the driver depressing the brake pedal thus results in an immediate and reliable response of the brakes.

It is quite evident that the friction can be provided in a place other than between the abutment stud and the support member. For example, it can be provided by means located at the periphery of the wear pad and the resiliency of the pad then would not have to overcome the resistance of this friction.

As an example, a brake of the above type was designed in which the wear differential between the center and the edges of the pad was more than 4 thousandths of an inch, whereas the usual automatic adjusting devices give a normal lost motion between the disc and the lining which does not exceed one hundredth of an inch.

The operation of the parking brake shown on FIGURE 5 is very similar to that described above for hydraulic actuation. The action of the driver on the mechanical linkage causes the rotation of the lever 68 and develops about the pins 70 a force which tends to shift the housing towards the right and apply the fixed wear pad. The force exerted through the end faces 72 of the lever on the push pins causes the application of the movable wear pad. For the latter, the application of two applying forces, each at about the same distance from the center of the lateral edge of said pad, results in a substantially equal pressure over the whole surface of the lining, which has no detrimental effect on the return of the pad to normal position, since mechanical application is practically realized only for the parking of the vehicle, that is to say without substantial wear of the lining.

When the driver releases the mechanical linkage, the lever comes back to its original position under the action of the return forces developed by the resilient pads, and which act respectively against the end faces 72 of the lever and its articulation on the pins 70.

It is to be understood that the application of the invention is not limited to the particular embodiment described herein. The rotatable disc can be driven by its inner periphery or its outer periphery. The first case has been described above; the second case corresponds to a mounting in which the support member crosses the plane of the disc through the inside of the latter. Changes in the manner of guiding the different elements with respect to the fixed support member can also intervene. The use of resilient wear pads described for the above type of brake can be adapted to numerous other brakes and also to clutches. It must be understood that such applications or modifications remain within the scope of the present invention.

We claim:
1. A brake comprising a rotatable disc, a fixed support member, a housing having a fluid pressure responsive member mounted slidably therein, means forming a mounting connection between said housing and support member and providing floatable movement of said housing in an axial direction relatively to said support member, said housing comprising a pair of angularly spaced yoke members which embrace said disc, a brace member interconnecting said yoke members, a friction member one on each side of said rotor and carried by said support member to transmit thereto the circumferential reaction exerted by said friction member upon engagement thereof with said rotatable disc, means forming a thrust connection between said pressure responsive member and one friction member, a thrust connection between said brace member and the other of said friction members whereby actuating force is communicated to both friction members pressing them against their opposed disk surfaces and means located between said friction members and yoke members for slidably guiding the ends of each of said friction members as they move slidably therein into engagement with their respective opposed disc surfaces.

2. The brake structure in accordance with claim 1 wherein said fixed support member comprises a U-shaped structure straddling a periphery of said disc; said brace member at one side of said disc interconnecting said yoke members and said pressure responsive member including a cylinder unit at the opposite side of said disc interconnecting said yoke members.

3. The brake structure in accordance with claim 2 including an abutting connection between said brace member and one of said friction members and a piston which is received in said cylinder unit and includes an abutting connection with the other of said friction members.

4. A brake structure in accordance with claim 3 including an applying lever pivoted on the side of said housing having a piston actuator and operatively connected to said friction member actuated by said piston.

5. A brake comprising a rotatable disc, a fixed support member straddling the periphery of said disc and having sides extending contiguously to said disc, a housing, means for mounting said housing on said fixed support member for floatable axial movement relatively to said support member, friction members located in said housing one adjacent each side of said disc, means for slidably connecting said friction members with said support member to transmit the circumferential reaction from engagement of said friction member with said rotating disc to said support member, a hydraulic actuator carried by said housing for moving said friction members into engagement with said disc by effecting lateral applying thrust on said friction members and receiving their axial reaction force independently of said fixed support member, and mechanical applying means for said friction members including a pair of axially extending pins slidably received in openings on one side of said housing and engageable with one of said friction members and a lever member mounted on said housing and engageable with said pins.

6. A brake comprising a rotatable disc, a U-shaped fixed support member having two legs one on each side of said disc, a housing located at one side of said rotor, means for mounting said housing for axial movement relatively to said support member, a pair of friction members located one on each of the opposite sides of the disc, rigid means forming a relatively solid extension of said housing which straddles transversely the periphery of said rotor and includes a force transmitting portion in operative engagement with one of said friction members to effect its engagement with said disc, each of said legs of said support having means forming anchoring abutments between said friction members and support member to receive anchoring load directly between said friction members and their respective support legs, complementary bearing surfaces of said friction members slidably engageable with said means forming an anchoring abutment to hold said friction members against circumferential movement, actuating means located laterally offset and in collinear relation with the other of said friction members and with said one friction member to effect engagement of said other friction member with said rotor and to develop a reaction force acting through said housing and its ertension means to clamp both said friction members against their opposed rotor surfaces and to resist the axial reaction force of their engagement with said rotor surfaces independently of said U-shaped support.

7. A brake comprising a rotatable disc, two friction members disposed one on each side of said rotor, a fixed support having spaced members each extending over the periphery of said rotor and each having portions disposed contiguously to opposite sides of said rotatable disc, actuating means for biasing said friction members laterally into engagement with the opposed sides of said disc and including a housing and piston slidably mounted therein, means for mounting said housing for axially floatable movement relatively to said support member, means forming anchoring abutments in each spaced support member side for a respective one of said friction members, complementary bearing surfaces of said friction members which are slidably engageable with said anchoring abutments to effect slidable connections which hold said friction members against circumferential movement, means forming a thrust connection between said piston and one of said friction members, and means forming a second thrust connection between said actuating means and the other of said friction members to effect its application.

8. A brake comprising a rotor having oppositely facing flat, substantially parallel annular braking surfaces and mounting means for securing said rotor to the member to be braked, a torque-taking member secured at a radially inner portion thereof to a nonrotatable member and extending therefrom to provide limbs spaced along the axis of rotation of said rotor one on each side of said rotor and disposed closely adjacent each of the annular surfaces of said rotor, friction members located one on each side of said rotor and having friction surfaces engageable with the opposed rotor surfaces, means forming slidable anchoring surfaces on said limbs spaced closely adjacent each of the rotor braking surfaces for each of said friction members which are laterally movable thereon and relatively to said limbs, said friction members each having anchoring surfaces complementary to and engageable with the anchoring surfaces of its respective limb to transmit anchoring load thereto, and actuating means for effecting axial movement of said friction members into frictional engagement with their respective rotor surfaces, said actuating means including an axially movable housing which includes a cylinder bore and piston slidably mounted therein, one of said friction members being disposed between said piston and its adjacent rotor surface and having a thrust connection with said piston to effect engagement of said one friction member with its opposed rotor surface, and means forming an extension of said housing and transversely straddling a periphery of said rotor and providing a thrust connection with the other of said friction members, said housing and its extension means being urged in one direction as said piston is urged in an opposite direction whereby said friction members are pressed against their opposed rotor surfaces by the respective thrust connections of said piston and housing extension means.

References Cited in the file of this patent
UNITED STATES PATENTS

| | | |
|---|---|---|
| 2,172,788 | Christensen | Sept. 12, 1939 |
| 2,689,024 | Trevaskis | Sept. 14, 1954 |
| 2,781,106 | Lucien | Feb. 12, 1957 |
| 2,784,811 | Butler | Mar. 12, 1957 |
| 2,820,530 | Chouings et al. | Jan. 21, 1958 |

FOREIGN PATENTS

| | | |
|---|---|---|
| 708,748 | Great Britain | May 12, 1954 |
| 709,305 | Great Britain | May 19, 1954 |
| 714,962 | Great Britain | Sept. 8, 1954 |
| 728,376 | Great Britain | Apr. 20, 1955 |

UNITED STATES PATENT OFFICE
CERTIFICATE OF CORRECTION

Patent No. 3,035,664 May 22, 1962

Jean Lucien Desvignes et al.

It is hereby certified that error appears in the above numbered patent requiring correction and that the said Letters Patent should read as corrected below.

Column 4, line 20, for "csae" read -- case --; column 6, line 63, for "ertension" read -- extension --.

Signed and sealed this 26th day of March 1963.

(SEAL)
Attest:
ERNEST W. SWIDER

Attesting Officer

DAVID L. LADD

Commissioner of Patents